(12) United States Patent
Young

(10) Patent No.: US 7,492,904 B2
(45) Date of Patent: Feb. 17, 2009

(54) QKD SYSTEM DETECTOR AUTOCALIBRATION BASED ON BIT-ERROR RATE

(75) Inventor: Jonathan Young, Newburyport, MA (US)

(73) Assignee: MagiQ Technologies, Inc., New York, NY (US)

( * ) Notice: Subject to any disclaimer, the term of this patent is extended or adjusted under 35 U.S.C. 154(b) by 780 days.

(21) Appl. No.: 11/110,227

(22) Filed: Apr. 20, 2005

(65) Prior Publication Data

US 2006/0239460 A1  Oct. 26, 2006

(51) Int. Cl.
*H04L 9/00* (2006.01)
*H04K 1/00* (2006.01)

(52) U.S. Cl. .................. 380/278; 380/277; 380/255
(58) Field of Classification Search ............... 380/277, 380/278, 255; 977/755
See application file for complete search history.

(56) References Cited

U.S. PATENT DOCUMENTS

| | | | |
|---|---|---|---|
| 4,469,942 | A | 9/1984 | Srivastava et al. |
| 6,236,488 | B1 | 5/2001 | Shimizu et al. |
| 6,445,478 | B2 | 9/2002 | Shimizu et al. |
| 6,462,825 | B1 | 10/2002 | Wiebesick et al. |

FOREIGN PATENT DOCUMENTS

WO   WO 9404889   3/1994

OTHER PUBLICATIONS

Security Aspects of the Authentication Used in Quantum Cryptography Cederlof, J.; Larsson, J.-A.; Information Theory, IEEE Transactions on vol. 54, Issue 4, Apr. 2008 pp. 1735-1741.*
Unconditionally secure key distribution in higher dimensions by depolarization Hoi Fung Chau; Information Theory, IEEE Transactions on vol. 51, Issue 4, Apr. 2005 pp. 1451-1468.*
Key Distribution Using Dual Quantum Channels Jin, Di; Verma, Pramode; Kartalopoulos, Stamatios; Information Assurance and Security, 2008. ISIAS '08. Fourth International Conference on Sep. 8-10, 2008 pp. 327-332.*
Stucki et al, "Photon counting for quantum key distribution with Peltier cooled InGaAs/InP", http://arxiv.org quant-ph/0106007v1, pp. 1-18, Jun. 1, 2001.

* cited by examiner

*Primary Examiner*—David Y Jung
(74) *Attorney, Agent, or Firm*—Opticus IPLaw PLLC

(57) ABSTRACT

In a quantum key distribution (QKD) system, a method of autocalibrating the gating of a single-photon detector (SPD) unit is disclosed. The method includes exchanging photon signals (P1, P2) to establish a bit-error rate (BER). The method also includes performing a detector gate signal timing scan (314) that varies the signal arrival time (T) to establish an optimum arrival time ($T_{MIN}$) corresponding to an optimum (e.g., minimum) BER. Detector gate signal timing dithering is then performed (318). This involves varying the detector gate signal arrival times about the optimum arrival time to ensure that the QKD system operates at or near an optimum BER.

20 Claims, 4 Drawing Sheets

Position/Arrival time T (ns)
of Detector Gate Signal (S3)

US 7,492,904 B2

QKD SYSTEM DETECTOR AUTOCALIBRATION BASED ON BIT-ERROR RATE

CROSS-REFERENCE TO RELATED APPLICATIONS

The present invention is related to PCT patent application Ser. No. PCT/US05/06909, entitled "Laser autocalibration for QKD systems," filed on Mar. 3, 2005, and to U.S. patent application Ser. No. 11/110,031, entitled "QKD system laser autocalibration based on bit-error rate," filed on Apr. 20, 2005.

TECHNICAL FIELD OF THE INVENTION

The present invention relates to and has industrial utility in the field of quantum cryptography, and in particular relates to and has industrial utility in connection with apparatus and methods of autocalibrating a quantum key distribution (QKD) system to maintain optimum system performance.

BACKGROUND ART

Quantum key distribution (QKD) involves establishing a key between a sender ("Alice") and a receiver ("Bob") by using weak (e.g., 0.1 photon on average) optical signals ("photon signals") transmitted over a "quantum channel." The security of the key distribution is based on the quantum mechanical principle that any measurement of a quantum system in an unknown state will modify its state. As a consequence, an eavesdropper ("Eve") that attempts to intercept or otherwise measure the photon signals will introduce errors into the transmitted signals, thereby revealing her presence.

The general principles of quantum cryptography were first set forth by Bennett and Brassard in their article "Quantum Cryptography: Public key distribution and coin tossing," *Proceedings of the International Conference on Computers, Systems and Signal Processing*, Bangalore, India, 1984, pp. 175-179 (IEEE, New York, 1984), and in the article by Bennett et al., "Experimental Quantum Cryptography," *J. Cryptology*, (1992) 5: 3-28, which articles are incorporated by reference herein. A specific QKD system is described in U.S. Pat. No. 5,307,410 to Bennett (the '410 patent), which patent is incorporated by reference herein.

The above-mentioned publications and the '410 patent each describe a so-called "one-way" QKD system wherein Alice randomly encodes the polarization or phase of the photon signals, and Bob randomly measures the polarization or phase of the photon signals. The one-way system described in the '410 patent is based on two optical fiber Mach-Zehnder interferometers. Respective parts of the interferometric system are accessible by Alice and Bob so that each can control the phase of the interferometer. The signals (pulses) sent from Alice to Bob are time-multiplexed and follow different paths. As a consequence, the interferometers need to be actively stabilized during transmission to compensate for thermal drifts.

U.S. Pat. No. 6,438,234 to Gisin (the '234 patent), which patent is incorporated herein by reference, discloses a so-called "two-way" QKD system that is autocompensated for polarization and thermal variations. Thus, the two-way QKD system of the '234 patent is less susceptible to environmental effects than a one-way system.

When operating a commercial QKD system, multiple variables need to be aligned in time and then maintained aligned for optimum system performance. For example, in a commercial QKD system one or more single-photon detectors (SPDs) are gated with a gating signal from a controller to synchronize the detection of optical pulses with expected pulse arrival times. However, once the system is set up, the timing drifts due to various systemic and environmental factors. This causes the photon count to drop, which in turn leads to a reduction in the transmission rate of the system, and to an increase in the bit-error rate (BER)—i.e., to less-than-optimum system performance.

While laboratory and prototype QKD systems can be adjusted to account for system drifts under very controlled and artificial conditions, making the necessary adjustments to maintain optimum or near-optimum performance of a commercial QKD system in the field is a far more daunting endeavor. And, unlike with a laboratory or prototype QKD system, end-users of commercial QKD systems have an expectation that their QKD system will automatically run in an optimum state with minimal or no operator intervention.

SUMMARY OF THE INVENTION

A first aspect of the invention is a method of autocalibrating a QKD system having two operably coupled encoding stations, where one of the encoding stations includes a single-photon detector (SPD) unit operably coupled to a controller. The method includes performing a detector gate signal timing scan by sending a detector gate signal (S3) from the controller to the SPD unit and varying the arrival time T of the detector gate signal over a first timing range R1. The method also includes determining an optimum timing $T_{MIN}$ for the detector gate signal that corresponds to an optimum BER (e.g., a minimum, $BER_{MIN}$) when exchanging photon signals between encoding stations of the QKD system. The method further includes performing detector gate signal timing dithering by varying the arrival time T over a second timing range R2 surrounding $T_{MIN}$ to maintain the BER at an optimum value, such as the minimum $BER_{MIN}$.

A second aspect of the invention includes performing detector gate signal width scanning to obtain an optimum detector gate signal width $W_{MIN}$, and also performing detector gate signal width dithering to maintain the detector gate signal at or near the optimum signal width.

A third aspect of the invention is method of exchanging a key in a quantum key distribution (QKD) system having two encoding stations, with an SPD unit operably coupled to a controller in one of the encoding stations. The method includes exchanging the photon signals between the encoding stations in the QKD system to establish a bit-error rate (BER). The method also includes performing a first detector gate signal timing scan by sending detector gate signals from the controller to the SPD unit over a range of detector gate signal arrival times T to establish a first optimum arrival time $T_{MIN}$ that corresponds to a first optimum BER. The method also includes terminating the first detector gate signal timing scan when the first $T_{MIN}$ is established, and then performing a first detector gate signal timing dither. The first detector gate signal timing dither is accomplished by the controller altering the arrival time T of the (optimum) detector gate signal over a range of arrival times R2 about the first $T_{MIN}$ to maintain either the first optimum BER (say, $BER_{MIN}$) or a different optimum BER (say, $BER'_{MIN}$) over the range R2. The method optionally includes performing detector gate signal width scans and signal width dithering to establish and maintain an optimum detector gate signal width $W_{MIN}$ that corresponds to an optimum BER.

A third aspect of the invention is a continuation of the method of the second aspect of the invention described immediately above, wherein performing the detector gate signal timing dither results in a new optimum arrival time $T'_{MIN}$. The method of the third aspect of the invention includes terminating the performing of a detector gate signal dithering and performing a second detector gate signal timing scan, terminating this second scan, and then performing a second detector gate signal timing dither to automatically re-establish the bit error rate at or near the optimum BER, thereby establishing optimum (or near-optimum) system performance.

These and other aspects of the invention are described in detail below.

Figure 1:
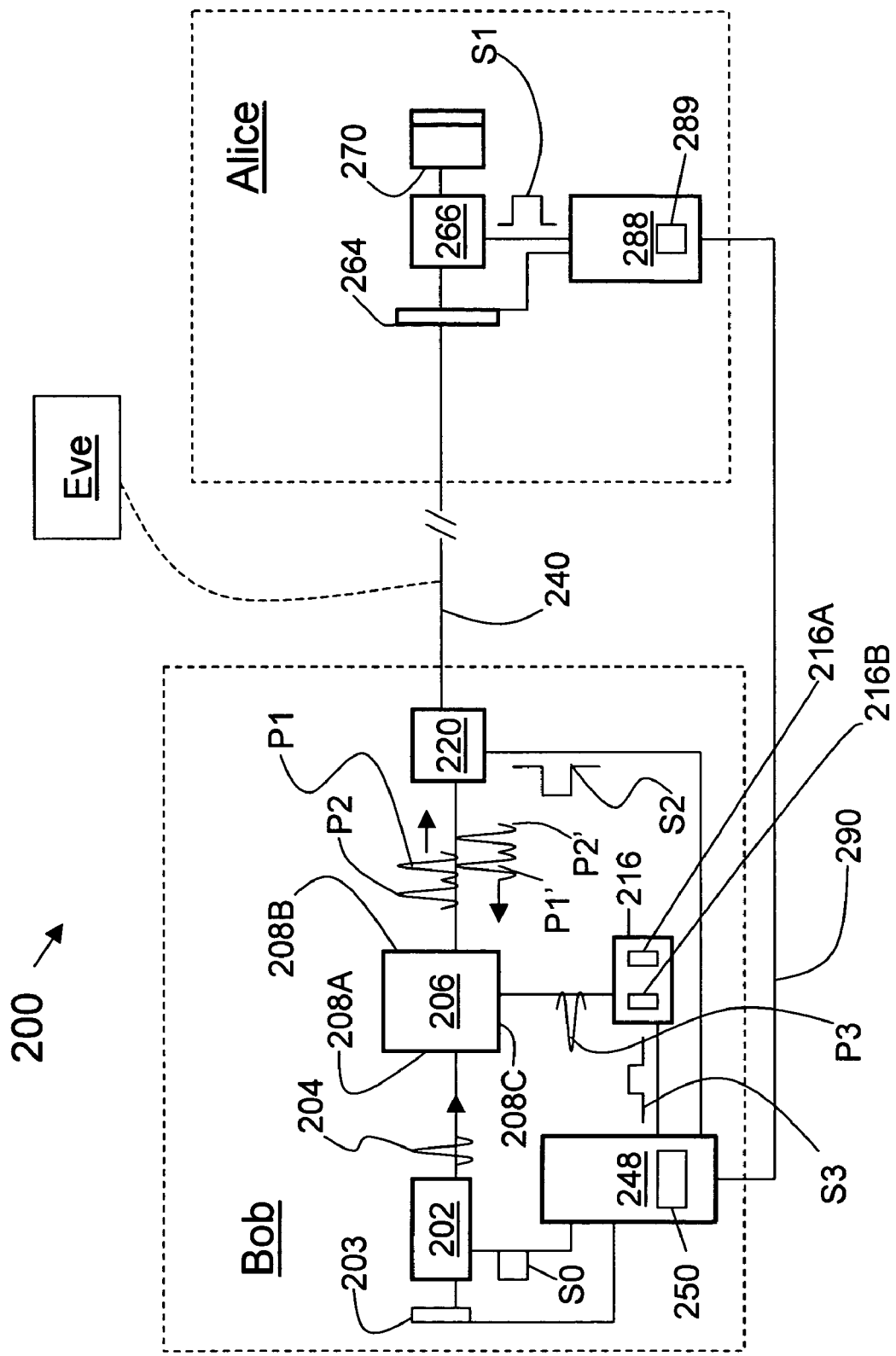
FIG. 1 is an example embodiment of a two-way QKD system suitable for implementing the method of the present invention.

The various elements depicted in the drawings are merely representational and are not necessarily drawn to scale. Certain sections thereof may be exaggerated, while others may be minimized. The drawings are intended to illustrate various embodiments of the invention that can be understood and appropriately carried out by those of ordinary skill in the art.

DETAILED DESCRIPTION OF THE INVENTION

The present invention relates to methods of performing autocalibration of a QKD system to maintain optimum system performance. In particular, the present invention involves performing detector gate signal scanning to determine the optimum detector gate signal position (timing), as well as performing detector gate signal timing dithering in order to maintain the optimum timing of the detector gate signal during the QKD system's operation. This results in optimum photon signal detection (i.e., the greatest number of photon signal counts) in the QKD system, which generally corresponds to the optimum operation of the QKD system as a whole.

In an example embodiment, the invention is carried out by a programmed controller so that the system can be maintained as operating in an ideal or near-ideal state without operator intervention. Such autocalibration is important for a commercially viable QKD system.

The invention is applicable to one-way, two-way, ring topology and n-way QKD systems that use either polarization encoding or phase encoding, and that use one or more single-photon detectors. The invention is described below in connection with an example embodiment of a two-way QKD system using phase-encoding and a single-photon detector unit having two detectors. This choice of QKD system is merely for the sake of illustrating the methods of the present invention, and is not intended as limiting.

Also, in the description below, a "gating signal" is a signal that activates the element to which the signal is sent, wherein the activation of the element corresponds to the duration (width W) of the signal. Thus, the detector gate signal activates the SPD detector unit for the duration (i.e., width W) of the detector gate signal, wherein activation starts at the leading edge of the signal and ends at the trailing edge of the signal. In the case of the pulsed laser, the laser gating signal generates an optical pulse from the laser at some point during the width of the laser gating signal (say, at the rising edge of the gating signal). The resulting optical pulse may have an optical signal width smaller than that of the width of the laser gating signal.

Also, in the discussion below, the laser generates optical pulses used to exchange keys between the two encoding stations of the QKD system and to establish a BER. In a preferred embodiment, the optical pulses are attenuated after they leave the laser to form the quantum pulses (referred to below as "photon signals") that have, on average, one photon or less. Thus, in the description below and in the claims, the phrase "photon signals generated by the laser" and similar phrases are understood to include the case where the laser generates relatively strong optical pulses that are later attenuated (e.g., via a variable attenuator) to form the photon signals, as well as the case wherein the laser is a single-photon source or is otherwise included in a single-photon source.

In addition, the term "minimum BER" as used herein refers generally to a figure of merit that is based on measuring the bit-error rate during the QKD process, e.g., using standard BER-measuring and BER-correction procedures.

QKD System Embodiment

FIG. 1 is a schematic diagram of an example embodiment of a folded QKD system 200 to which the methods of the present invention are aptly suited. System 200 includes two operably coupled key encoding ("encoding") stations: a transmitting/receiving station Bob and a reflecting station Alice, referred to hereinafter simply as "Bob" and "Alice."

Bob

With continuing reference to FIG. 1, Bob includes a laser 202 that emits optical pulses 204. In an example embodiment, laser 202 is a laser diode and includes a back facet monitor (BFM) 203. Laser 202 is operably coupled to a time-multiplexing/demultiplexing optical system 206 having an input end 208A, an input/output end 208B, and a detector output end 208C. Optical system 206 receives input pulses 204 at input end 208A, splits each pulse into two time-multiplexed orthogonally polarized pulses P1 and P2 and outputs them at input/output end 208B. Likewise, optical system 206 also receives optical pulses at input/output end 208B, as described below.

A single-photon detector (SPD) unit 216 is operably coupled to optical system 206 at detector output end 208C. In an example embodiment, SPD unit 216 includes two SPDs 216A and 216B. SPD unit 216 is also referred to herein as "the detector." A phase modulator (PM) 220 is operably coupled (e.g., by an optical fiber) to optical system input/output end 208B. An optical fiber 240 connects Bob to Alice at PM 220.

Bob also includes a controller 248 operatively (e.g., electrically) operably coupled to laser 202, BFM 203, SPD unit 216, and PM 220 to control the operation of these elements, as described below. In an example embodiment, controller 248 is or includes a programmable computer capable of performing instructions (e.g., "software") stored on a computer-readable medium 250. In an example embodiment, the instructions stored on the computer-readable medium 250 include methods according to the present invention as described below.

Alice

Alice includes a variable optical attenuator (VOA) 264 connected to optical fiber 240. A phase modulator (PM) 266 is arranged downstream of and is optically operably coupled to VOA 264. A Faraday mirror 270 is arranged downstream of and is optically operably coupled to PM 266.

Alice also includes a controller 288 operatively (e.g., electrically) operably coupled to PM 266 and VOA 264. In an example embodiment, controller 288 includes a programmable computer capable of performing instructions (e.g., "software") stored on a computer-readable medium 289. In an example embodiment, the instructions stored on the computer-readable medium 289 include methods according to the present invention as described below.

Controllers 248 and 288 are linked (e.g., electrically or optically) via synchronization link 290 to synchronize the operation of Alice and Bob. In particular, the operation of the laser 202, phase modulators 220 and 266, and SPD unit 216 are controlled and coordinated by controllers 248 and 288 relative to the launched optical pulse 204 using gating signals S0, S2, S3 and S1, respectively, when exchanging a quantum key between Alice and Bob. Thus, in an example embodiment, controllers 248 and 288 are considered as constituting a single controller for the QKD system.

QKD System Operation

With continuing reference to FIG. 1, in the operation of system 200, a laser gating signal S0 is sent by controller 248 to laser 202 to generate optical pulse 204. Optical pulse 204 is then divided into two separate pulses P1 and P2 by time-multiplexing/demultiplexing optical system 206. In an example embodiment, pulses P1 and P2 are relatively weak pulses, but can be strong pulses attenuated later at Alice prior to returning to Bob. The optical pulses P1 and P2 are passed out of optical system input/output end 208B to PM 220, which is gated to allow the pulses to pass therethrough unmodulated. Pulses P1 and P2 then pass to Alice over optical fiber 240. Pulses P1 and P2 continue to VOA 264, which can attenuate the pulses if necessary. The pulses then pass through PM 266 and are reflected by Faraday mirror 270, and then pass back through PM 266 a second time.

During one of the passes of pulses P1 and P2 through PM 266, the PM modulates one of the pulses—say, pulse P1—to form a phase-modulated pulse P1'. This is achieved by controller 288 sending a well-timed gating signal S1 that activates PM 266 for the short period of time (i.e., less than the time-separation between the pulses) when pulse P1 passes through PM 266. Pulses P1 and P2 then pass back through VOA 264, which can attenuate the pulses, if necessary, to ensure that photon signals (i.e., optical pulses having an average number of photons of one or less) are exchanged between Bob and Alice.

The pulses then pass back to Bob as photon signals and pass to PM 220. PM 220 is then directed to randomly modulate one of the pulses—say the remaining unmodulated pulse P2—with one of the select phase modulation values to form a modulated pulse P2'. This is achieved by controller 248 providing a well-time gating signal S2 to PM 220 that activates the phase modulator during the short time period within which pulse P2 passes through PM 220.

Now-modulated pulses P1' and P2' continue on to optical system 206. Optical system 206 combines the pulses to form a combined pulse P3, which is directed out of detector output end 208C to SPD unit 216. SPD unit 216 receives combined pulse P3. SPDs 216A and 216B are gated by a detector gating signal S3 and as such, are only active for a time equal to the width (i.e., gating interval) of the detector gating signal. If the combined pulse P3 arrives at one of the SPDs during the detector gating interval, SPD unit 216 outputs a signal to controller 248 that corresponds to the relative phases imparted to pulses P1 and P2 by PM's 266 and 206, respectively. In an example embodiment, one of detectors 216A and 216B receives the interfered pulse P3, depending on whether the interference is constructive or destructive. If the imparted phase is neither constructive nor destructive, pulse P3 winds up in either SPD with equal probability.

Once a desired number of photon signals are exchanged, the key is derived using standard techniques—for example, by Alice and Bob publicly comparing the basis of their measurements and only keeping the measurements (bits) corresponding to the same measurement basis. This forms the sifted key. Then, as described in pages 8-10 in the aforementioned article "Experimental quantum cryptography" by Bennett et al., the bit positions in the sifted key are permuted and the permuted key partitioned into blocks. Alice and Bob then test each block for parity and identify and discard the error bits. This process is iterated until the number of errors in the sifted key is satisfactorily reduced or eliminated, thereby establishing a secure quantum key. This process also allows for determining the BER, and is used in an example embodiment of the present invention to determine the BER in the methods described below.

The act of eavesdropping on optical fiber 240 by Eve intercepting or otherwise attempting to measure the weak optical pulses being transmitted between Bob and Alice will necessarily introduce errors in the key due to the quantum nature of the photons being exchanged. However, bit errors also arise from noise (e.g., detector dark current) or from the system not being properly calibrated. For example, if the timing of the activation of laser 202 or the gating of SPD unit 216 is not optimum, then pulses 204 will not sent or detected at the proper time, which increases the BER.

Methods of Maintaining Optimum System Operation

Figure 2:
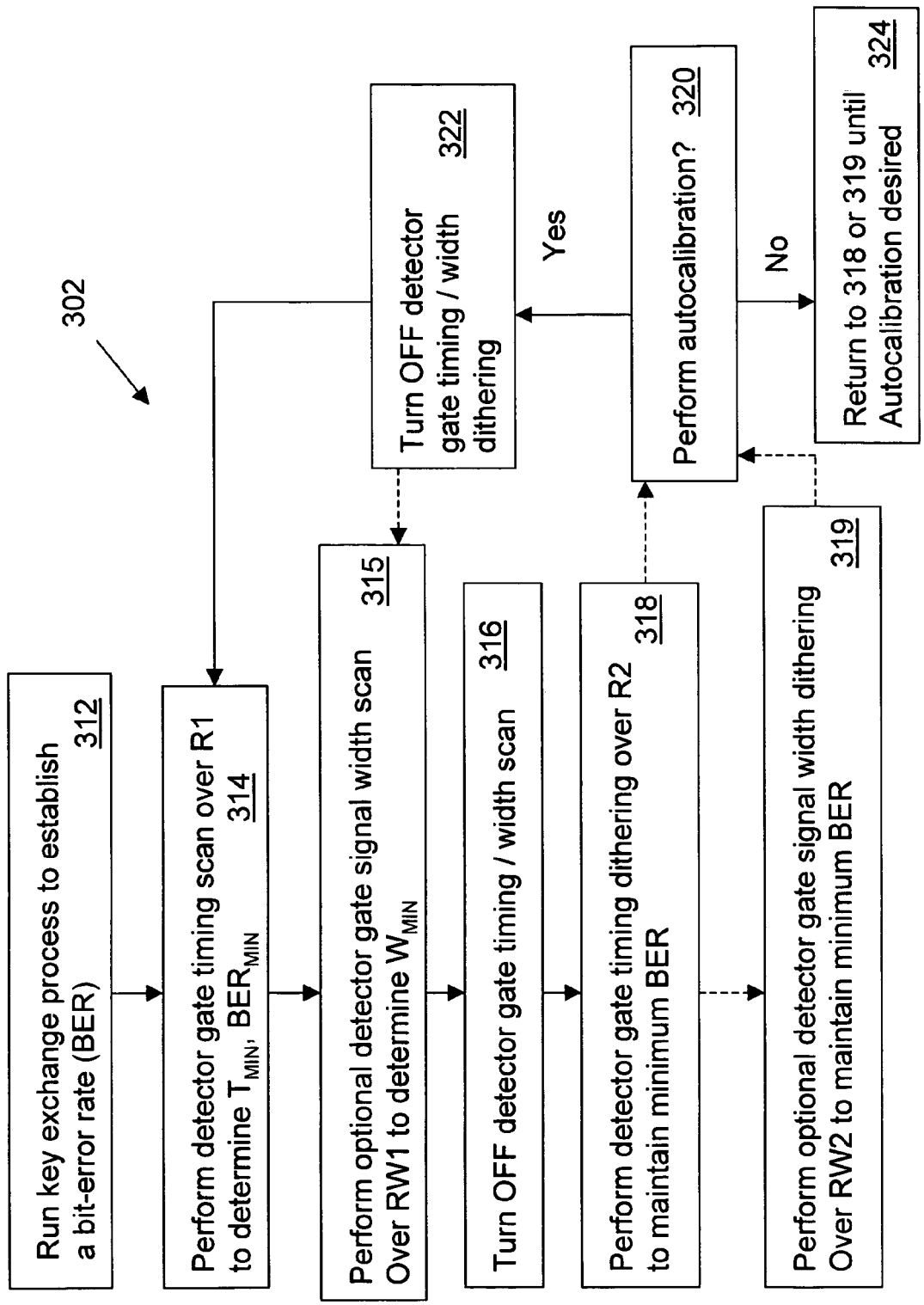
FIG. 2 is a flow diagram illustrating an example embodiment of a detector autocalibration method, which includes scanning and dithering the timing of the detector gate signal, and optionally scanning and dithering the detector gate signal width, to optimize the BER while exchanging photon signals.

FIG. 2 is a flow diagram 302 of the method of the present invention for maintaining optimal system operation of QKD system 200 of FIG. 1. The method involves performing both a detector gate scan and a detector gate dither in the manner described below.

In 312, the key exchange process is initiated by controller 248 instructing light source 202 to emit optical pulses 204 so that time-multiplexed optical pulses P1 and P2 can be sent from Bob to Alice. This process includes controller 288 instructing PM 266 to phase modulate one of the pulses, having the pulses travel back to Bob, modulating the remaining pulse, combining the modulated pulses, and detecting the combined pulse P3 in SPD unit 216, as described above. The key exchange process is carried for a time sufficient to establish a BER.

It is worth noting that in the case where SPD unit 216 includes two detectors 216A and 216B, it is typically a good presumption that drifts (e.g., thermal drifts) occurring in the SPD unit affect SPDs 216A and 216B to essentially the same extent, so that the two SPD drift together. Thus, in an example embodiment, detector gate signal S3 serves to gate both SPDs 216A and 216B.

Figure 3:
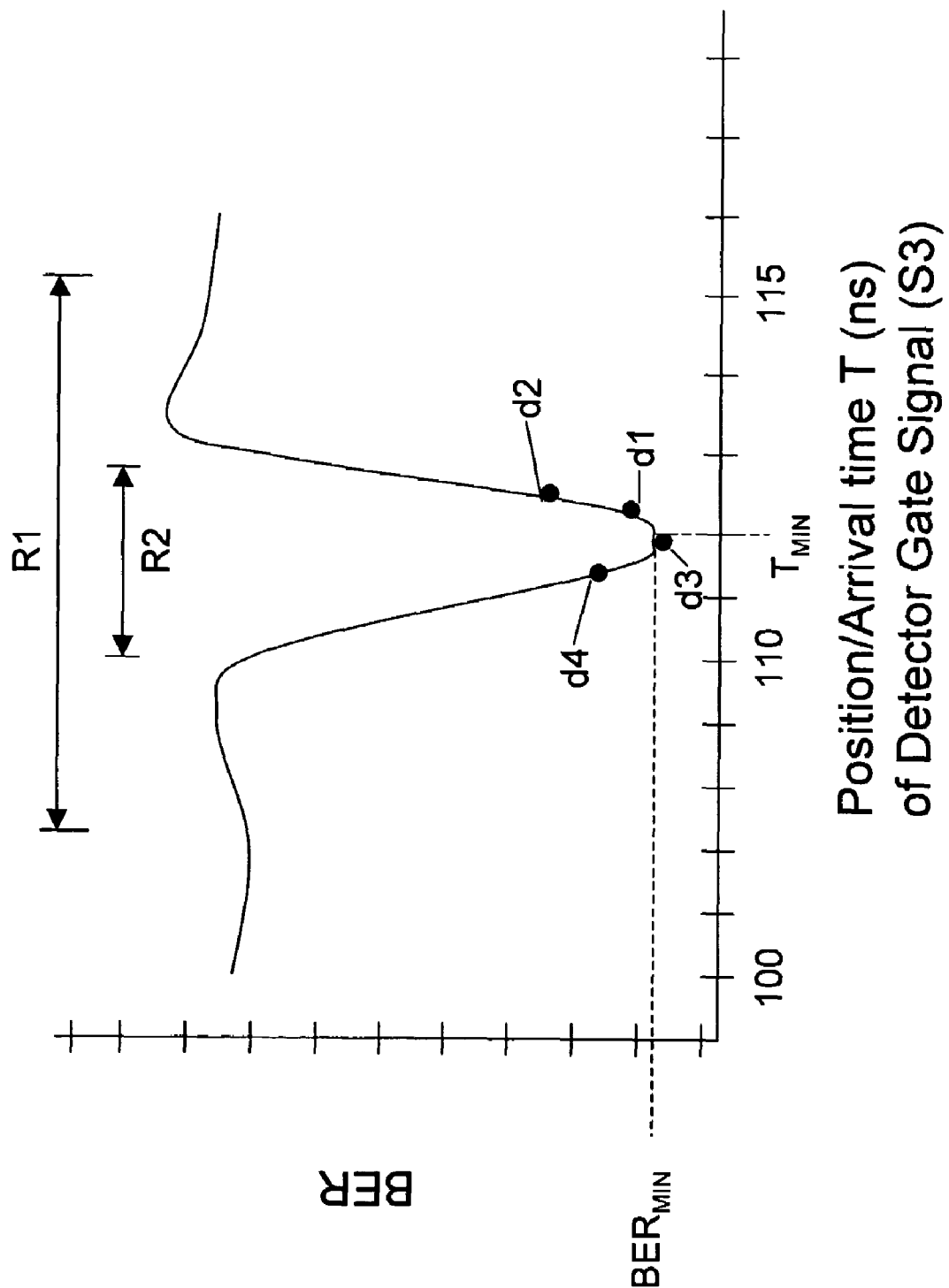
FIG. 3 is an example plot representing a single-photon detector gate signal timing scan for a QKD system such as that shown in FIG. 1, wherein the Y-axis is BER, and the X-axis is the timing (arrival time) T of the detector gate signal S3.

In 314, a detector gate scan is performed. FIG. 3 is an example plot of a detector gate scan for a QKD system such as that shown in FIG. 1, wherein the Y-axis is BER, and the X-axis is the timing (arrival time) T of the detector gate signal S3. Performing the detector gate scan involves varying the timing (e.g., the arrival time T) of detector gate signal S3 over a selected range R1 of timing values to establish the optimal gate signal timing (arrival time) $T_{MIN}$ that yields an optimum bit-error rate $BER_{MIN}$ resulting from the counts in SPD unit 216.

Figure 4:
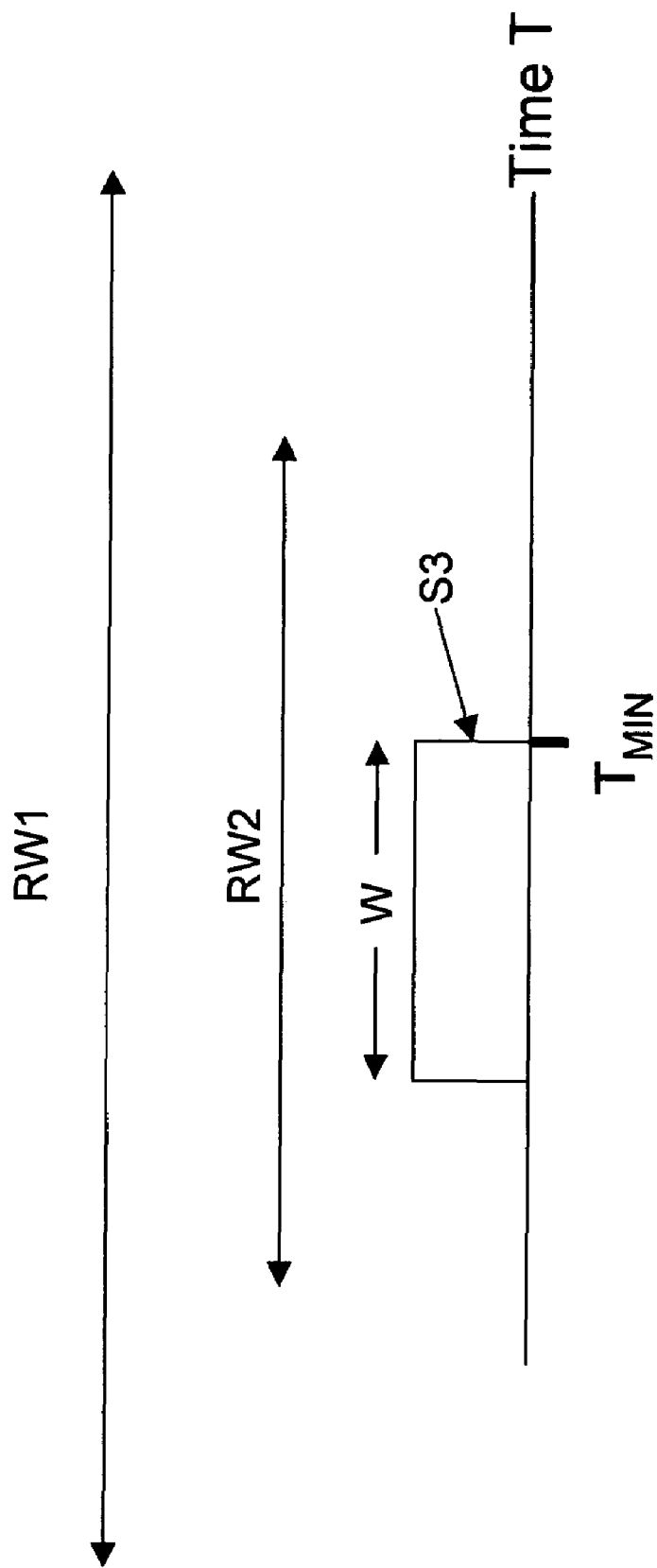
FIG. 4 is a timing diagram of a detector gate signal illustrating the timing ranges associated with optionally scanning and dithering the detector gate signal width W to establish an optimum signal width $W_{MIN}$.

FIG. 4 is a timing diagram of the detector gate signal. In example embodiment of the detector gate scan, in 315 the detector gate signal width W is also optionally varied ("scanned") over a selected width range RW1 to establish the optimum detector gate signal width $W_{MIN}$ that yields an optimum (e.g., a minimum) bit-error rate $BER_{MIN}$.

Once $T_{MIN}$ and the optimum bit-error rate $BER_{MIN}$ are determined, then the process proceeds to 316, wherein the detector gate signal timing scan (or width scan) is terminated (i.e. is turned OFF).

In 318, detector gate signal timing dithering is performed. This involves repeatedly changing the timing (e.g., arrival time T) of detector gate signal S3 by small amounts within a select timing range R2 around the maximum arrival time $T_{MIN}$. If necessary, the signal arrival time T is shifted from its original optimal value $T_{MIN}$ to a new optimal value $T'_{MIN}$ so that the bit-error rate BER is maintained at the minimum value $BER_{MIN}$ (or alternatively, to a new minimum bit-error rate $BER'_{MIN}$). Note that select range R2 is less than R1 (i.e., R2<R1) and is selected to surround a relatively small range about $T_{MIN}$.

The detector gate signal timing is dithered until it converges to minimum (or near-maximum) number of photon counts. Thus, during normal operation of single-photon detectors 216A and 216B, the detector gate signal dithering process keeps the single-photon sensitivity high. In an example embodiment, detector gate signal dithering is performed periodically, for example every second. This rate is proportional to the number of single photon counts received.

In an example embodiment, in 319 an optional detector gate signal width dithering is performed, wherein the width W is dithered over a small range RW2 (where RW2<RW1) about the optimal signal width $W_{MIN}$ (FIG. 4).

In 320, the choice of performing an autocalibration of the detector gate signal S3 by initiating another detector gate signal timing scan is presented. If such autocalibration is desired or otherwise deemed necessary, then the method proceeds to 322. In 322, the detector gate signal timing or width dithering is turned OFF and the process returns to the detector gate signal timing scan of 314 or the detector gate signal width scan of 315 to perform an updated calibration of the detector gate signal timing and/or detector gate signal width to find a new optimal arrival time $T_{MIN}$ and/or optimal signal width $W_{MIN}$. This updated calibration may need to be performed for a variety of reasons, such as a detected change in the environment or because of normal system drifts. In an example embodiment, detector autocalibration is performed when any of the following conditions occur: a) a change in photon count levels outside of statistical limits, b) ambient temperature changes greater than a predetermined amount such as 0.5° C. occur, c) an optical path has changed configuration, as through a switching network element, different from event a) as in a message of pending event will be sent before the change in photon count levels, d) on a daily schedule due to known daily temperature cycling, e) on a fixed time basis, such as every hour, whether needed or not.

The need to turn OFF the detector gate dither prior to performing the detector gate scan arises because the two processes can interfere with one another. Specifically, while the detector gate scan tries to increment the timing or width of the single photon detector gate signal in a smooth (i.e., incremental) fashion, the detector gate dither tries to adjust the timing (e.g., the arrival time T) of detector gate signal S3 over variable back and forth over small increments in order to stay on the maximum number of photon counts. Consequently, the two competing processes can product spurious results. Thus, following a scan and update of the detector gate signal parameters during the detector gate signal timing scan of 314, the detector gate signal timing dither is automatically (or alternatively, is manually) turned back ON. The same is done for the detector gate signal width scanning and dithering.

If there is no desire or need to perform the autocalibration, then in 324 the method returns to (or remains in) either the detector gate signal timing dither mode of 318 or the detector gate signal width dither mode of 319. The periodic detector gate signal timing dither process generally results in slight changes of the value of $T_{MIN}$ in order to maintain the minimum bit error rate $BER_{MIN}$, or alternatively to maintain the bit error rate at new minimum values $BER'_{MIN}$, $BER''_{MIN}$, etc. For the sake of clarity and simplicity, in the present invention, "minimum bit error rate" can mean $BER_{MIN}$, $BER'_{MIN}$, $BER''_{MIN}$, etc. Likewise, the "optimal arrival time $T_{MIN}$" can change, and so in the present invention can mean $T_{MIN}$, $T'_{MIN}$, $T''_{MIN}$, etc. The same is true with the detector gate signal width dither process and $W_{MIN}$.

In an example embodiment, the above-described method of the present invention is embodied in at least one of computer readable medium 250 and 289 and is executed by at least one of controller 248 and 288 to carry out the method in QKD system 200.

In an example embodiment, one or more of the methods of the present invention is/are embodied in at least one of computer readable medium 250 and 289 and is executed by at least one of controllers 248 and 288.

While the present invention has been described in connection with preferred embodiments, it will be understood that it is not so limited. On the contrary, it is intended to cover all alternatives, modifications and equivalents as may be included within the spirit and scope of the invention as defined in the appended claims

What is claimed is:

1. A method of autocalibrating a quantum key distribution (QKD) system having operably coupled encoding stations and a single-photon detector (SPD) unit in one of the stations, the method comprising:
   a) performing a detector gate signal timing scan by sending a detector gate signal to the SPD unit and varying an arrival time T of the detector gate signal over a first range R1 to determine an optimum arrival time $T_{MIN}$ that corresponds to an optimum bit-error rate (BER) of $BER_{MIN}$ for photon signals exchanged between the two encoding stations; and
   b) performing detector gate signal timing dithering by varying the arrival time T over a second range R2 surrounding $T_{MIN}$ to maintain the BER at or near $BER_{MIN}$.

2. The method of claim 1, including:
   terminating the detector gate signal timing dithering and performing another detector gate signal timing scan.

3. The method of claim 1, wherein the QKD system includes a programmable controller and a computer readable medium, wherein the detector gate signal is provided by the controller, and wherein the method is embodied in the computer readable medium such that the controller is capable of directing the QKD system to carry out acts a) and b).

4. The method of claim 1, including:
   performing a detector gate signal width scan by varying a width W of the detector gate signal over a first width range RW1 to determine an optimum width $W_{MIN}$ that corresponds to an optimum bit-error rate.

5. The method of claim 4, including:
performing detector gate signal width dithering by varying the width W over a second width range RW2, where RW2<RW1, to maintain the detector gate signal width at or near the optimum width $W_{MIN}$.

6. A computer-readable medium having instructions embodied therein to direct a computer in a quantum key distribution (QKD) system having a detector unit to perform the following method of autocalibrating the QKD system:
 a) performing a detector gate signal timing scan by sending detector gate signals to the laser and varying an arrival times T of the detector gate signals over a first range R1 to determine an optimum arrival time $T_{MIN}$ that corresponds to an optimum bit-error rate (BER) of $BER_{MIN}$.

7. The computer-readable medium of claim 6, furthering including instructions embodied therein to direct the computer to perform detector gate signal timing dithering by varying the arrival times T of the detector gate signals over a second range R2, where R2<R1, surrounding $T_{MIN}$ to maintain the BER at or near the optimum BER of $BER_{MIN}$.

8. The computer-readable medium of claim 6, wherein the optimum BER of $BER_{MIN}$ is a minimum BER.

9. A method of exchanging a key in a quantum key distribution (QKD) system having a single-photon detector (SPD) unit operably coupled to a controller, comprising:
 exchanging photon signals between encoding stations in the QKD system to establish a bit-error rate (BER);
 performing a first detector gate signal timing scan by sending detector gate signals from the controller to the SPD unit over a range of arrival times T; and
 establishing a first optimum arrival time $T_{MIN}$ for the detector gate signal corresponding to a first optimum BER of $BER_{MIN}$.

10. The method of claim 9, including:
 terminating the first detector gate signal timing scan when the first $T_{MIN}$ is established; and
 performing a first detector gate signal timing dither by the controller altering the arrival time T over a range of arrival time R2 about the first $T_{MIN}$ to maintain either the BER of $BER_{MIN}$ or a different minimum bit-error rate BER of $BER'_{MIN}$.

11. The method of claim 10, wherein performing the detector gate signal timing dither results in a new optimum arrival time $T'_{MIN}$ associated with the BER of $BER'_{MIN}$.

12. The method of claim 10, further including:
 terminating the performing of the first detector gate signal timing dither;
 performing a second detector gate signal timing scan;
 terminating the second detector gate signal timing scan; and
 performing a second detector gate signal timing dither.

13. The method of claim 9, further including:
 performing a detector gate signal width scan by varying a width W of the detector gate signal over a first width range RW1 to determine an optimum width $W_{MIN}$ that corresponds to an optimum BER.

14. The method of claim 13, further including:
 performing detector gate signal width dithering by varying the width W over a second range RW2, where RW2<RW1, to maintain the detector gate signal width at or near an optimum width $W_{MIN}$ that corresponds to an optimum BER.

15. A computer-readable medium having instructions embodied therein to direct a computer in a quantum key distribution (QKD) system adapted to control the operation of the QKD system to perform the following method of autocalibrating the QKD system:
 establishing a bit-error rate (BER) by sending photon signals between operably coupled encoding stations in the QKD system, wherein one of the stations includes a single-photon detector (SPD) unit gated by a detector gate signal having an arrival time T;
 performing a first detector gate signal timing scan by varying the arrival time T over a range of arrival times R1 to establish a first optimum arrival time $T_{MIN}$ corresponding to a first minimum BER of $BER_{MIN}$;
 terminating the first detector gate signal timing scan when the first $T_{MIN}$ is established; and
 performing a first detector gate signal timing dither by altering the arrival time T over a range R1 of arrival times R2, where R2<R1, about the first $T_{MIN}$ to either a) maintain the first minimum BER of $BER_{MIN}$, or b) establish a different minimum bit-error rate $BER'_{MIN}$.

16. A method of autocalibrating a quantum key distribution (QKD) system having operably coupled encoding stations, with one of the stations having a single-photon detector (SPD) unit operably coupled to a controller adapted to provide detector gate signals to the SPD unit, the method comprising:
 exchanging photon signals between encoding stations in the QKD system to establish a bit-error rate;
 performing a detector gate signal timing scan by varying an arrival time T of the detector gate signal to determine an optimum arrival time $T_{MIN}$ corresponding to an optimum bit-error rate of $BER_{MIN}$; and
 dithering the arrival time T about $T_{MIN}$ to either a) maintain the bit-error rate at or near the first optimum bit-error rate of $BER_{MIN}$, or b) establish a second optimum bit-error rate of $BER'_{MIN}$.

17. The method of claim 16, wherein the detector gate signals have a width W, and further including performing a detector gate signal width scan by varying the width W over a range RW1 of widths to establish a minimum bit-error rate.

18. A method of autocalibrating a quantum key distribution (QKD) system having operably coupled encoding stations, wherein one of the stations includes single-photon detector (SPD) unit operably coupled to a controller adapted to gate the operation of the SPD unit via detector gate signals, the method comprising:
 performing a detector gate signal timing scan to establish an optimum arrival time of the detector gate signals that corresponds to an optimum bit-error rate when exchanging photon signals between the encoding stations;
 terminating the detector gate signal timing scan; and
 performing a detector gate signal timing dither by varying the arrival time of the detector gate signal around the optimum arrival time value to maintain the bit error rate at or near the optimum bit-error rate.

19. The method of claim 18, wherein the optimum bit-error rate is a minimum bit error rate.

20. The method of claim 18, wherein the detector gate signals have a width W, and further including adjusting the detector gate signal width to maintain the bit-error rate at or near the optimum bit-error rate.

* * * * *